Oct. 13, 1970 — W. KRENMAYR — 3,533,704
METHOD OF AND APPARATUS FOR OPTICALLY TESTING
GLASS OBJECTS FOR CRACKS
Filed June 4, 1968
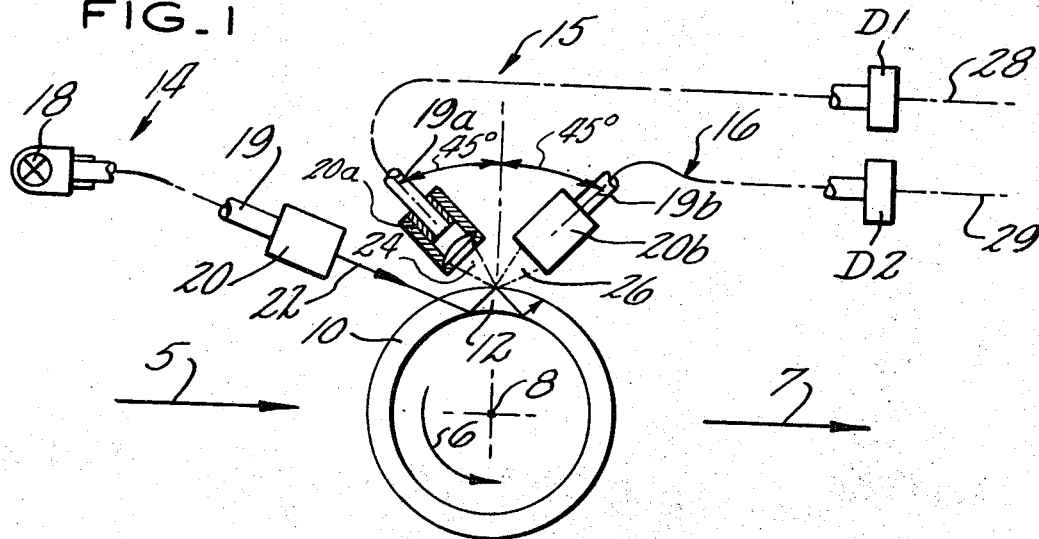
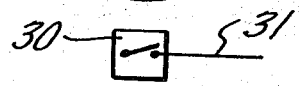
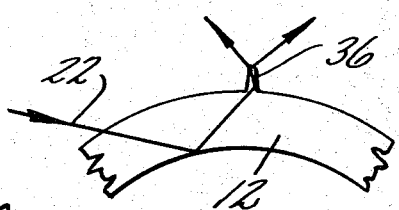
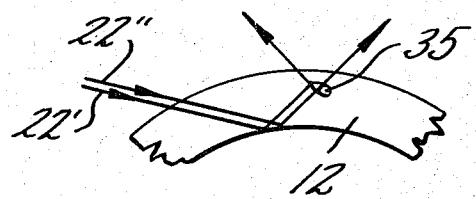
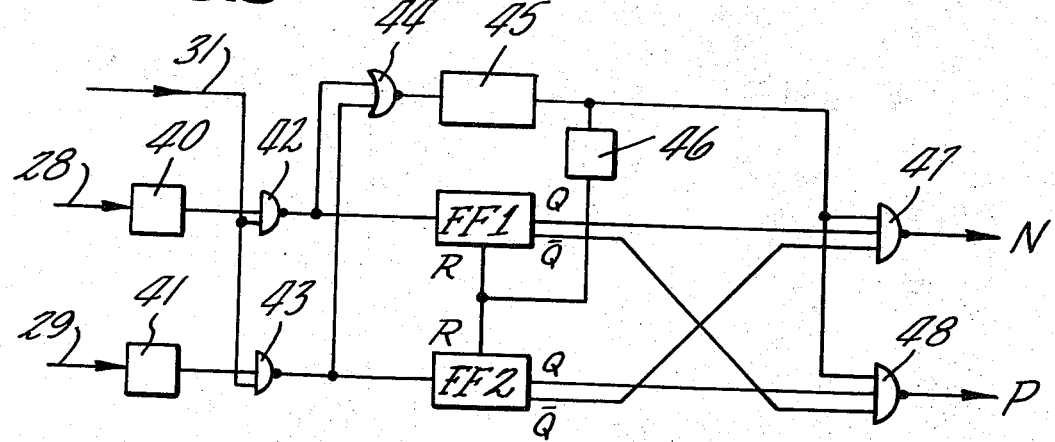
INVENTOR
WILLY KRENMAYR
BY McCormick, Paulding & Huber
ATTORNEYS

United States Patent Office 3,533,704
Patented Oct. 13, 1970

3,533,704
METHOD OF AND APPARATUS FOR OPTICALLY TESTING GLASS OBJECTS FOR CRACKS
Willy Krenmayr, Rapperswil, Switzerland, assignor to Emhart Corporation, Bloomfield, Conn., a corporation of Connecticut
Filed June 4, 1968, Ser. No. 734,456
Int. Cl. G01n 21/32
U.S. Cl. 356—198                                6 Claims

ABSTRACT OF THE DISCLOSURE

The ware is fed to an inspection station where it is rotated on its axis in the path of a light beam directed at an angle to the outer surface so that the beam penetrates said outer surface and is internally reflected off the inner surface, and again internally reflected off the outer surface if no fault is present in the zone to be inspected. Two light pickups are arranged at right angles to one another and at approximately 45° to a radial line drawn through the zone to be inspected. If a crack is present in this zone, the light beam will be reflected so as to emerge and be sensed by one light pickup only. Other faults such as bubbles small ribs or seams will cause the light beam to be split up and emerge in more than one direction so as to be sensed by both light pickups. A coincident logic circuit produces a negative pulse whenever a crack is detected and a positive pulse whenever another fault is detected.

BACKGROUND OF INVENTION

When manufacturing objects made of glass, the necessity frequently arises of testing these objects for possible cracks; more particularly, with the mass production of glass vessels, it is necessary to reject as defective those vessels which show relatively large or small cracks on their rim portion, since such cracks considerably increase the danger of the glasses breaking and make impossible a satisfactory tight closure.

In addition to visual testing, optical test methods have already been proposed for automatically finding cracks. In these cases, a light beam is directed on to a scanning zone of the test element and a relative movement is produced between the test element and the light beam or the scanning zone, and during the relative movement, there are observed rays emanating from the scanning zone which are deflected in the test element because of faults extending through the glass. For this purpose, there is utilized the fact that a crack in the glass represents an optical boundary layer at which, with the incidence of the light beam in the direction glass/air and depending on the incidence angle, there is obtained either ordinary reflection and refraction or total reflection.

The great disadvantage of known optical test arrangements of this type consists in that they cannot distinguish between actual cracks and other optically effective faults in the test element. As well as cracks, there are in fact many types of faults, such as included air bubbles, relatively small ribs or seams, etc., which would not have any deleterious effect on the useful value of the test element, but which optically act similarly to a crack in the known test arrangements so that consequently the test elements are likewise rejected in undesirable manner. In the absence of this capacity for distinguishing between actual defects and faults in the test element which can be tolerated, it is therefore necessary to accept either too many rejects or, with less sensitive setting of the test arrangement, the danger of undiscovered cracks. The said distinction is particularly difficult when there are concerned test elements which comprise a screwthread, locking cam or the like in the region of the scanning zone.

SUMMARY OF INVENTION

This invention relates to glassware inspection, and deals more particularly with an apparatus and method for distinguishing between glass cracks and other faults which are tolerable so that only truly defective ware need be rejected.

A general object of the present invention is to provide an inspection apparatus and method, including the coincident logic circuitry, for reliably generating a reject signal whenever an article of glassware has an objectionable crack, but not when the article has a bubble or seam or other tolerable fault.

The test method according to the invention is characterized in that two different angle sectors starting from the scanning zone are controlled and that a distinction is made between whether, in passing through a fault, rays emerge practically simultaneously in both sectors or only in the one sector in which totally reflected rays are produced.

The invention is further concerned with a test arrangement for carrying out the method as mentioned above, said arrangement containing a projection device directed towards a scanning zone of the test element. The test arrangement according to the invention is characterized in that two detector devices operating without contact are so aligned relatively to the scanning zone that they selectively respond to the radiation issuing in two separate angle sectors and produce corresponding electric signals, and that the detector devices are connected to an electric evaluation circuit for the coincidence testing of the signals.

It is to be mentioned that optical test arrangements having more than one detector are known per se, but the detectors operate independently of one another, in that their signals have an equivalent effect and individually cause the rejection of test elements; thus, they do not depend on any timed relationship between the signals. The only effect which is to be achieved with such arrangements when using several detectors is that a larger range of possible angular positions of the cracks in covered.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

BRIEF DESCRIPTION OF THE DRAWING

FIG. 1 shows diagrammatically the optical part of the test arrangement,

FIGS. 2, 3 and 4 illustrate the path of rays in passing through different, typical faults in the test element, and FIG. 5 is a circuit diagram of a logic evaluation circuit for checking the coincidence of the signals produced by the two detector devices.

DETAILED DESCRIPTION

The optical test arrangement according to FIG. 1 serves to examine the opening rim of cylindrical glass vessels 10, of which one is seen from above in the testing position, for possible cracks. The test elements are fed in succession from the side in the direction of the arrow 5, are then rotated about their axis 8 in the test position as shown and in the direction of the arrow 6 (or with an opposite direction of rotation), the said elements making at least one complete revolution, and after the testing has taken place, they are carried away in the direction of the arrow 7. Conventional means for carrying out this movement cycle is not more fully shown herein for the sake of simplicity. A scanner or feeler device 30 arranged in a fixed position produces an electric control signal on the line 31 while a test element is at the inspection station.

The crack-checking device according to FIG. 1 contains essentially a projection device 14 and two detector devices 15, 16. The projection device 14 comprises a light source 18 and a projection head 20, which are interconnected by way of a so-called light conductor, advantageously in the form of a flexible, light-conducting bundle of light-conducting fibers. The projection head 20 produces a fine parallel light beam 22 (for example, of round cross-section with a diameter of 0.2 mm.), which is directed on to the test element 10. The two detector devices 15 and 16 are each of similar construction and comprise a pickup head 20a, 20b, and a detector D1 or D2, each pickup head being connected to the associated detector by a flexible, light-conducting bundle of fibers 19a, or 19b. Serving as detector D1 or D2 is a suitable photoelectric cell, which generates an electric signal on the output line 28 or 29 corresponding to the radiation incident by way of the light conductor. Both pickup heads 20a and 20b are directed on to the same position on the test element, which is referred to as the scanning zone 12, but in such a way that they are only able selectively to pickup that beam which emebres from the scanning zone 12 in a specific angle sector 25 or 26, which two sectors do not overlap one another. The projection head 20 and the pickup heads 20a, 20b are fixed in the test station adjacent the test element in a manner not shown in detail, but their position is adjustable to conform to the actual shape of the test element. It would obviously be possible to arrange the light source 18 directly in the projection head 20 and the detectors D1 and D2 in the corresponding pickup heads; however, the use of flexible light conductors as shown in the example makes it possible for the said heads to be made particularly small and correspondingly to be fixed close to the test element without thereby impeding the free passage of the test elements. During the rotation of the test element 10 in the testing station, each place on the rim to be tested for cracks passes through the scanning zone 12. The annular rim of the glass vessel to be checked acts as a light conductor for the pencil of rays 22 which enter said rim, in that the beam, as can be seen from FIG. 1, is reflected alternately on the inner surface and on the outer surface of the rim. The light beam thus normally passes through the scanning zone 12 in a predetermined direction. It is conceivable for the beam 22 to be directed other than in the manner shown on to the scanning zone 12, also without previous reflection on a glass/air boundary surface, for example, obliquely from above, if the projection head 20 is situated above the test element 10 or on the opposite side.

Under normal conditions, i.e. when the rim has a smooth, intact surface, the light beam 22 remains "caught" inside the glass because of the repeater internal reflection, so that the pickup heads 20a and 20b and the detectors are not affected. It is only when an optical discontinuity or fault present in the glass passes through the scanning zone 12 that the ray is able to emerge from this region in the test element, and a distinction is to be made between certain typical cases as regards the emergence of the ray into the two angle sectors 24 and 26, which cases are to be hereinafter considered by reference to FIGS. 2, 3 and 4, which are on a larger scale.

FIG. 2 shows a glass crack 34, and the manner in which this defect would be detected by the test arrangement on travelling through the scanning zone 12. Such a crack constitutes a practically flat glass/air boundary surface, at which the light beam 22 is reflected, when it is incident relatively to the perpendicular L to the plane of the crack at an angle $a$ which is larger than the so-called limiting angle of the total internal reflection which is determined by the ratio of the refractive indices between glass and air. According to experience, such cracks 34 are disposed practically radially on the rim; the direction of incidence of the light beam 22 is chosen by fixing the projecting head 20 such that the said total internal reflection condition is satisfied with certain deviations in the radial position of the crack. On account of the total reflection at the crack 34, the light beam emerges from the glass and in fact at such an angle that it is within the angle sector 24, no ray being able to emerge in the direction of the sector 26. As a consequence, with the passage of a crack 34 through the scanning zone 12, an electric signal is produced by the detector D1, while no signal is produced by the detector D2.

FIG. 3 illustrates the position with the passage of a seam, projection or rib 36. At individual places on the seam, for example, on its rear flank, the light beam 22 is totally reflected and conducted towards the tip. At the tip, and also at other places, e.g. at the base of the seam, there is ordinary reflection combined with refraction, so that one part of the ray emerges towards the sector 24, but another part also emerges into the region of the sector 26. Thus, in each case, during the passage of the seam 36, light reaches both detector D1 and D2 almost simultaneously.

Similar conditions are also produced according to FIG. 4 during the passage through the scanning zone 12 of an air bubble 35 contained in the glass. By contrast with a crack, such a bubble forms an irregularly curved glass/air boundary surface, on which practically always the condition for total reflection is satisfied at individual places (beam 22'), but not at other places on account of a steeper incidence angle (beam 22''), so that at the latter places, a part of the light beam passes through the boundary surface. Thus, with the passage of a bubble 35, a totally reflected radiation emerges from the scanning zone 12 in the direction of the sector 24, and also a broken radiation in the direction of the sector 26. Consequently, in this case, an electric signal is produced by both detectors D1 and D2 almost simultaneously, i.e. within the travel time of the fault.

With other optically effective faults (not shown) which can be tolerated or may even be desired (e.g. screw-threads, closure cams, etc.) similar phenomena to those with FIGS. 3 and 4 often occur, or there may even be diffused reflection which is distributed to both angle sectors or substantially only emerges towards the sector 26. According to FIG. 2, it is only cracks which are able, because of their defined shape and position, to result in all the radiation being deflected by total reflection exclusively into the sector 24 and not also into the sector 26. From this knowledge, in accordance with the present invention, there is derived a criterion for distinguishing between cracks 34 and other faults which can be tolerated, by the signals of the detectors D1 and D2 being evaluated in a coincidence circuit. Consequently, on the basis of the time relationship between the signals from the two detectors, a distinction is made with the passage of a fault between whether the radiation emerges almost simultaneously into both sectors 24, 26 or only towards the one sector 24, which is affected by totally reflected rays.

One example of such a coincidence circuit is shown in FIG. 5. In the logic evaluation circuit according to FIG. 5, the signals arriving from the detectors D1 and D2 via the lines 28 and 29 are each fed to a pulse-forming stage 40 and 41, respectively. Each pulse-forming stage generates an output pulse of definite shape when the corresponding input signal exceeds a minimum amplitude. Connected to the output of each pulse-forming stage is a gate 42 or 43, a second input of each gate being connected to the line 31, on which appears the "presence" signal of the feeler 30. The gates 42 and 43 are always only opened by the presence signal when a test element 10 is situated in the correct testing position. The output of each gate 42 and 43 is connected to the input of a flip-flop FF1 or FF2. Associated with each flip-flop is an output gate 47 or 48, the output signal Q of each flip-flop being conducted to the associated gate and the inverse output signal $\overline{Q}$ is conducted to the gate associated with the other flip-flop. For each gate 47 or 48, the signal Q represents an opening signal and the inverse signal $\bar{Q}$ represents a blocking signal. The outputs of the gates 42 and 43 are in addition connected to the inputs of an OR gate 44. Connected to this output is an adjustable time-delay member 45, which delivers an output signal to an additional input of the gates 47 and 48 after a certain time interval has elapsed after arrival of an input signal. By the rear flanks on the end of this pulse, a resetting signal is produced via a triggering stage 46, this signal being fed to the resetting inputs R of the two flip-flops FF1 and FF2. The time delay of the circuit 45 is set at a value which corresponds in size to the transit time of a fault through the scanning zone 12, this depending more especially on the speed of rotation of the test element in the testing station.

The manner in which this logic circuit operates is as follows: if the signal only arrives from the detector D1 (which corresponds to the passage of a crack), the flip-flop FF1 is triggered and thereby the gate 47 is opened and the gate 48 is blocked. The following pulse of the time member 45, which was initiated through the said signal via the gate 44, is thus only able to pass through the gate 47, so that an output signal appears on the line N, which represents a defect signal and in suitable manner causes the ejection of the test element concerned. On the other hand, if a signal only arrives from the detector D2, which signal cannot be produced by a crack, but only by a fault which can be tolerated, FF2 is triggered and thereby the gate 48 is opened and the gate 47 is blocked. The following pulse from the circuit 45 is thus only able to pass through the gate 48 and appears on the line P, which represents a "good" signal. If a signal arrives practically simultaneously from both detectors D1 and D2, i.e. within the travel time of the time-delay member 45, with the transit of a fault which can be tolerated, perhaps according to FIG. 3 or FIG. 4, then firstly FF1 is triggered and the gate 47 is opened, but on the other hand, by the triggering of FF2, the gate 47 is again blocked and the gate 48 opened, before the pulse arrives from the circuit 45, whereby the latter pulse passes as a "good" signal to the output line P. In this way, the circuit according to FIG. 5 distinguishes between the cracks to be rejected as defects and other optically effective faults which can however be tolerated. Each time after passage of a pulse from the circuit 45, FF1 and FF2 are reset through the circuit 46, so that the test procedure can be repeated several times during the rotation of the test element.

I claim:

1. A method for inspecting glass objects for cracks comprising the steps of:
    (a) directing a beam of light onto the object at an angle to its external surface so that the beam is internally reflected off its internal surface,
    (b) providing at least two light pick-ups adjacent the zone through which the light beam is normally transmitted by such internal reflection,
    (c) rotating the object on its axis so that a generally radially extending crack causes the light beam in the glass to be reflected toward one of said light pickups, and
    (d) monitoring the output signals of both light pickups with a coincidence circuit which produces a reject signal whenever such a crack is so detected.

2. The method according to claim 1 and further characterized by the additional steps of producing a good signal whenever said other light pickup and said crack detecting light pickup detect a portion of said light beam, and timing said coincidence circuit to recycle whenever a good signal is so produced to permit that glass object to be inspected for cracks as aforesaid.

3. Apparatus for inspecting glass objects for cracks comprising means for directing a light beam onto the object at an angle to its external surface so that the beam is internally reflected off its internal surface, two light pickups arranged at approximately right angles to one another so that only one of them is adapted to receive light reflected from a radially extending crack, said other light pickup being adapted to receive light only if a defect other than said crack lies in the path of said internally reflected beam, and a coincidence circuit for receiving output signals from said light pickups, said circuit including means for generating a reject signal when said one pickup detects light and said other pickup does not detect light from said normal internally reflected beam.

4. Apparatus according to claim 3 and further characterized by means in said coincidence circuit for generating a good signal whenever both light pickups detect portions of said internally reflected beam within a predetermined time.

5. Apparatus according to claim 3 and further characterized by adjustable timed means in said coincidence circuit for establishing the period of coincidence for said pickup output signals, said timed means also serving to recycle said coincidence circuit whenever a good signal is so produced whereby the object can be further inspected for cracks.

6. Apparatus according to claim 5 and further characterized by means for rotating the object at an inspection station, said timed means being set to recycle said circuit for detecting cracks in a plurality of zones as said object is so rotated.

References Cited

UNITED STATES PATENTS 3,249,224  2/1963  Uhlig.
3,302,786  2/1967  Conrad.
3,349,906  10/1967  Calhoun et al.
3,394,263  7/1968  Baker.

RONALD L. WIBERT, Primary Examiner

O. B. CHEW, II, Assistant Examiner

U.S. Cl. X.R.

250—223; 356—240